April 26, 1966  J. A. OGLE, JR., ETAL  3,248,518
BROILER-ROTISSERIE
Filed Sept. 23, 1964  2 Sheets-Sheet 1

INVENTORS
JAMES A. OGLE, JR.
BROR G. OLVING

BY *Robert W. Pastcurn*

ATTORNEY

April 26, 1966     J. A. OGLE, JR., ETAL     3,248,518
BROILER-ROTISSERIE
Filed Sept. 23, 1964     2 Sheets-Sheet 2
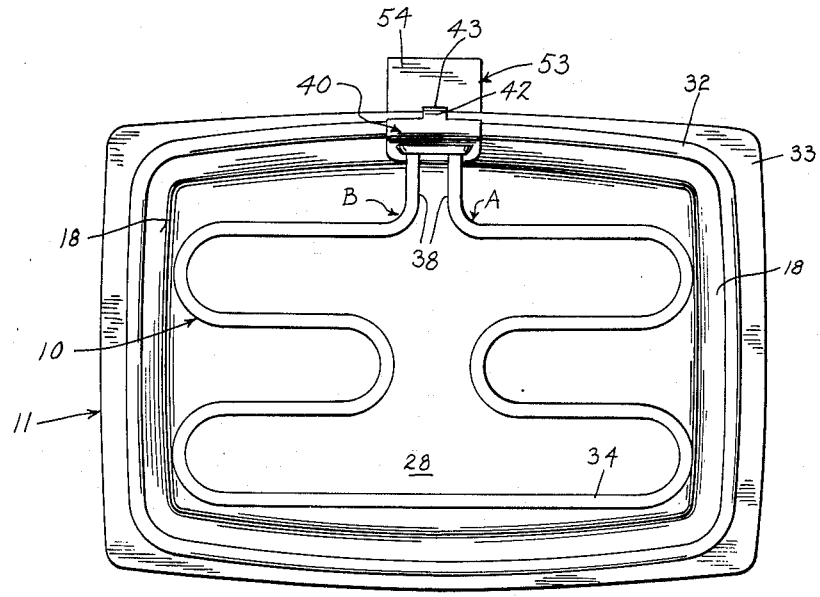
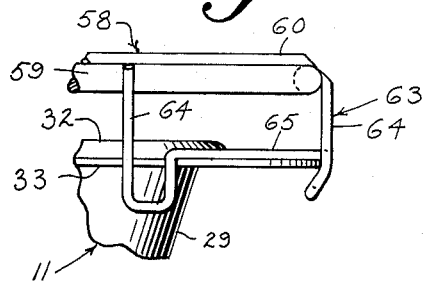
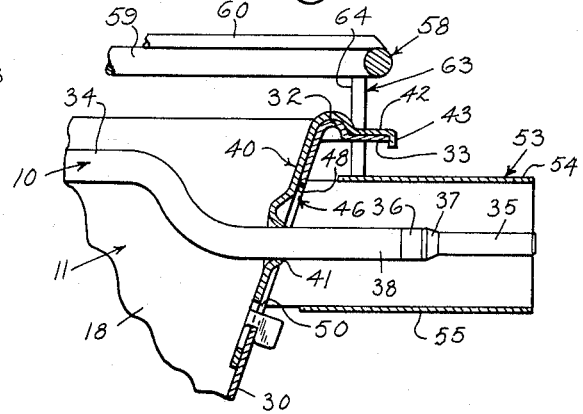
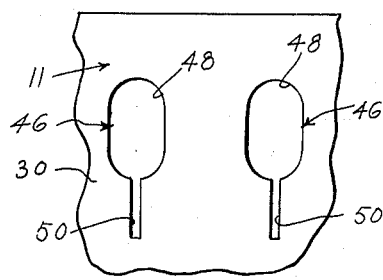
INVENTORS
JAMES A. OGLE, JR.
BROR G. OLVING
BY
ATTORNEY

United States Patent Office 3,248,518
Patented Apr. 26, 1966

3,248,518
BROILER-ROTISSERIE
James A. Ogle, Jr., Woodstock, and Bror G. Olving, Elgin, Ill., assignors to McGraw-Edison Company, Milwaukee, Wis., a corporation of Delaware
Filed Sept. 23, 1964, Ser. No. 398,691
4 Claims. (Cl. 219—447)

This invention relates to electric broilers and more particularly to improved portable electric broiler-rotisserie.

In the present invention the applicants have provided a broiler unit with a minimum number of parts that are readily assembled and disassembled for use and cleaning to afford a broiling device that is effective, safe and easily cleaned.

By using a substantially completely enclosed open top vessel wherein broiling takes place over the surface of a quantity of water overlying the bottom surface of the vessel drippings do not burn onto the bottom of the vessel. By disposing the article supporting grid at an optimum distance above the vessel and placing the heating elements within the upper portion of the vessel, effective broiling is accomplished without the hazard of flame from the drippings under the most severe operating conditions, such as may occur when the user is cooking the most difficult meats and neglects to use water in the vessel.

It is an object of this invention to provide a broiler-rotisserie that is portable, smokeless, and readily cleanable.

It is a further object of this invention to provide a broiling unit that is free from the hazard of flame during repeated, successive, cooking cycles.

It is also an object of this invention to provide a portable broiling unit wherein the elements are readily detachable from one another.

These and other objects and advantages of this invention will become apparent from the following description when taken in connection with the accompanying drawings, wherein:

FIGURE 3 is a plan view of the broiler-rotisserie of FIGURE 1 with the grid, handles and rotisserie unit removed;

FIGURE 4 is a partial end view of the broiler-rotisserie of FIGURE 1 showing one of the front grid support members;

FIGURE 5 is a partial section view taken along line 5—5 of FIGURE 2;

FIGURE 6 is an elevation view of the aperture portion of the vessel rear wall.

Figure 1:
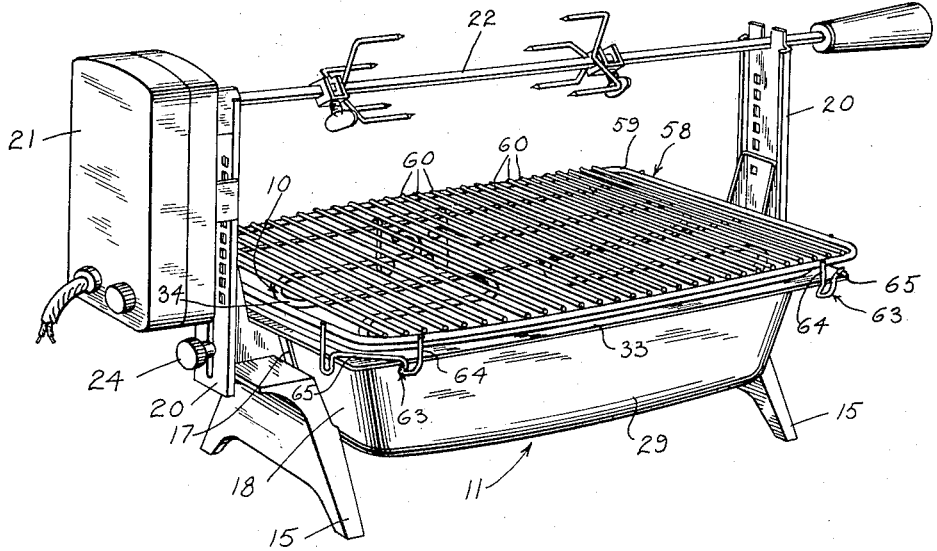
FIGURE 1 is a perspective view of the broiler-rotisserie of this invention.
Figure 2:
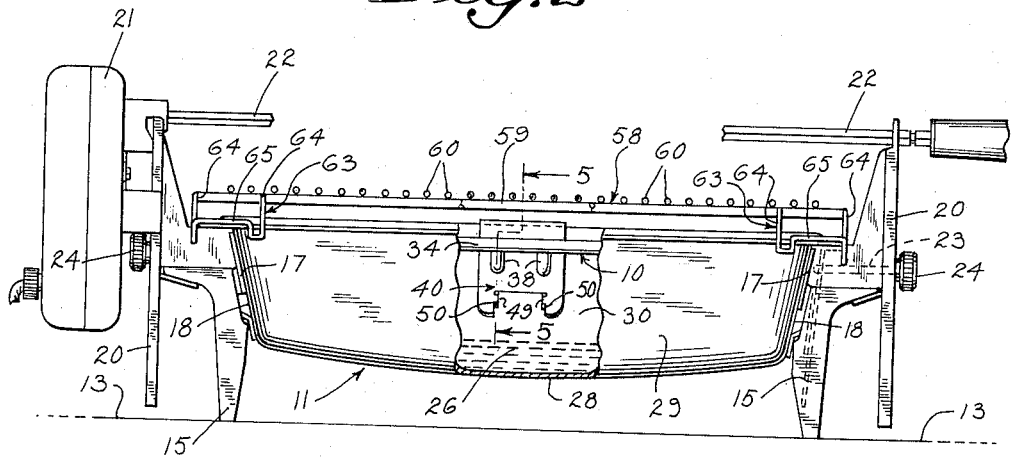
FIGURE 2 is a front elevation partially broken away and partially in section of the broiler-rotisserie of FIGURE 1.

Referring to FIGURES 1 and 2 a tubular, metal sheathed electrical resistance heating element 10 is supported within a single piece open top vessel or drip pan 11. The vessel 11 is supported above the surface 13 by a pair of removable support legs 15 each of which has a guideway formed therein which slidably receives the respective depending plate 17 secured to the vessel side wall 18. The vertically adjustable mounting brackets 20 which comprise the support for the motor 21 and spit 22 are secured to the vessel by a rod 23 which threadably engages the upper portion of the depending plate 17 and has a knurled knob 24 at the opposite end thereof. The mounting brackets 20 are removed horizontally outward when the rod 23 is disengaged from the depending plate 17 and thereafter the support legs are respectively removed by downward force exerted along the path of the guideway. The removable support leg 15 and rotisserie support structure are described in greater detail in the co-pending applications of the same assignee Serial No. 263,560 and Serial No. 393,218.

The vessel 11 is formed of drawn stainless steel sheet with a water tight lower cavity portion to accommodate a quantity of water 26 below the heating element as seen in FIGURE 2. The vessel includes a bottom wall 28 and the side walls 18, 29, 30 which have at the upper terminal portions thereof a peripheral ridge 32 and a horizontal flange 33 extending outwardly from the ridge 32.

Figure 7:
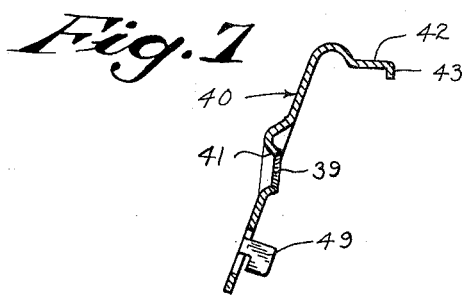
FIGURE 7 is a section view of the heating element mounting plate prior to assembly with the heating element.

As best seen in FIGURES 3 and 5 the heating element 10 comprises a tubular metal sheathed unit, which sheath is here made of stainless steel to resist food acids. The heating element 10 has a central heat release portion 34 that is a continuous generally double serpentine form extending from approximately A to B as indicated in FIG. 3 which is of conventional design wherein a resistance wire is enclosed within the sheath and electrically insulated from the metal sheath by being embedded in magnesium oxide. The element terminates at each end in a terminal 35 with the metal sheath isolated therefrom by the ceramic insulator 37 and peripheral seal 36. Intermediate the terminals 35 and the heat release portion 34 are a pair of cold sections 38 through which passes an electrical conducting cold pin electrically interconnecting the terminal and the resistance heating element. At generally the mid-portion of each cold section a mounting plate 40 is secured to the heater element. A tight friction fit forming a rigid connection between the boundary surface of aperture 41 and the heating element cold sections 38 is achieved by forming the mounting plate 40 with a series of serrations 39 along the edge surface defining the aperture. The heating element is thereafter assembled through the apertures and with the assembly held in a fixture, the marginal plate portion above the aperture is turned inwardly from the right, as viewed in FIG. 7, causing the serrations to be turned to a radially inwardly facing condition with the result that the serrations to be embedded in the sheath rigidly interconnect the parts.

The mounting plate 40 is held securely against the side wall 18 in the flush relation shown in FIG. 5 and by an upper hook portion 42 that opens downwardly, closely conforming to the side wall ridge 32 and rim 33 with the terminal downward depending flange 43 abutting the generally vertical edge surface of the rim. The side wall abutting the mounting plate has a pair of apertures 46 (FIG. 6) therein. The heating element cold sections 38 project through the upper enlarged aperture portions 48 and a pair of bayonet connections 49 stamped from and integrally formed as a part of the mounting plate 40 extend outside the side wall through the lower slotted aperture portions 50. The heating element 10 is mounted by inserting the terminal and cold section through the upper enlarged aperture portions 48 until the mounting plate 40 abuts the side wall 18 and thereafter sliding the mounting plate downwardly along the side wall interior surface until the hook 42 is secured over the upper portion of the rim 33 and the bayonet connecting portions are disposed behind the side wall 18 below the lower slotted aperture portions 50 to firmly secure and positively position and support the heating element with the heat release portion that commences at about the points A and B within the vessel as a horizontally cantilevered element while the terminal portions 35 project to the exterior of the vessel from the opposite side of the mounting plate 40 as a pair of cantilevered elements. In the assembled position, the terminals 35 are disposed within a ventilated shroud 53 that has top and bottom wall portions 54, 55 that do not extend to the vessel wall, but are spaced therefrom to provide a vertical air path adjacent the vessel. Power is applied to the heating element by conventional line cord (not shown) that connects to the terminals 35. The ventilated shroud 53 and the heating element cold sections 38 cooperate to limit the maximum temperature to which the line cord terminal portion connecting with terminals 35 is exposed.

The article supporting grid 58 is formed with a peripheral supporting rod member 59 that overlies the marginal edges of the vessel rim 33 with a series of parallel transverse wire members 60 welded at their ends to the principal rod 59. At each corner portion is a depending support member 63 formed of a continuous wire welded at its ends to the principal rod 59 with a U-shaped portion 64 at either end joined by a horizontal portion 65 interconnecting the adjoining legs of the U-shaped portions. The horizontal portion 65 of each depending support member lies across one of the corners of the vessel rim portion 33 and determines the height that the grid is positioned above the vessel while the depending U-shaped portions, by abutting the rim edge positively position the grid 58 in overlying relation to the vessel top opening and the heating element 10. Since permitting the grid 58 to be removed by lifting upward alone may cause accidental removal during operation of the broiler it will be noted that the U-shaped projections adjoining the front side wall 29 of the vessel have been turned back toward the vessel front wall requiring the grid be removed by lifting the portion overlying the rear wall 30 until the depending support member is above the ridge 32 and thereafter moving the grid horizontally in the direction of front wall 29.

In operation water is placed in the vessel 11 to a depth about one inch which keeps the bottom surface of the unit cool, eliminating the fire hazard associated with collected drippings and prevents the drippings from being baked on the bottom surface of the vessel. Collected drippings on the surface of the water are subsequently poured off with the water when preparing the vessel for cleaning after use.

When used as a broiler the article to be cooked is placed on the grid 58 which is positioned approximately one-half inch above the highest vertical projection of the side wall which in the illustrated embodiment is represented by the top of the ridge 32. Under many conditions it is possible to broil safely with a grid resting directly on the surface defining the vessel top opening, but with meats having a high fat content such as hamburgers and steaks it has been found necessary to support the grid in an elevated position above the top opening of the vessel to assure safe flame-free operation with any food being broiled. The most severe condition occurs when a full load of steaks are broiled due apparently to the concentrations of pure fat that are present even though the total percentage fat content may be less than other meats. It is important that the unit be safe from flame hazard even when subjected to successive full loads of steaks and even when the operator has failed to use water in the vessel as instructed. To achieve safe operating under all operating conditions the minimum clearance necessary between grid and vessel top opening is one-quarter inch to prevent ignition of drippings from such a fully loaded grid, but the illustrated one-half inch has been found to be an optimum value for heat concentration while eliminating the ignition hazard of successive full capacity loads of high fat content foods broiled on the grid surface.

After use the vessel, grid, support legs, mounting brackets, heating element, motor and spit are all easily separable from one another for cleaning. The vessel or drip pan has no drippings baked onto the bottom surface where the most severe condition would normally occur because of the presence of water in the vessel during operation. In addition the major portion of the heating element would be free of residue materials due to the high operating temperatures.

Although but one embodiment has been shown and described, it will be apparent to those skilled in the art that various changes and modifications may be made therein without departing from the spirit of the invention or from the scope of the appended claims.

What is claimed is:

1. A portable electric broiler comprising an open top vessel having side walls and a bottom wall with a watertight lower portion, said side walls terminating upwardly in a generally horizontal rim; a rigid metal sheathed electric resistance heating element having a central heat release portion terminating at its ends respectively in a pair of terminals with each said terminal separated from said heat release portion by a metal sheathed cold portion; a mounting plate fixedly secured to said heating element about said cold portions; aperture means adjacent an upper portion of one of said side walls, said mounting plate having a hook portion that conforms to and engages a portion of said rim and a vertically spaced projecting portion that extends through and engages said side wall at said aperture means to releasably secure said heating element to said one vessel side wall with said heat release portion cantilevered horizontally within said vessel and said pair of terminals cantilevered outwardly of said vessel; and an article supporting grid supported in vertically spaced overlying relation to said top opening and said heating element.

2. A portable electric broiler comprising a one piece open top vessel having side walls upwardly terminating in a rim and a bottom wall; a rigid metal sheathed electrical resistance heating element having the ends thereof terminating as a pair of horizontally spaced terminals and having a heat release portion; a mounting plate rigidly connected to said heating element with said heat release portion cantilevered from one side of said mounting plate and said pair of terminals cantilevered from the other side of said mounting plate; a pair of horizontally spaced apertures in one of said side walls, said plate carrying a pair of bayonet coupling portions respectively underlying portions of said heating element and extending through said apertures in coupling engagement with said side wall, said plate having an upper downwardly opening hook portion engaging said rim, said bayonet portions and said hook portions cooperating with said side wall to releasably secure said heating element heat release portion horizontally in said vessel.

3. A portable electric broiler comprising an open top vessel having a side wall with interior and exterior surfaces that terminates upwardly in a generally horizontal rim; a rigid metal sheathed electric resistance heating element having a central heat release portion terminating at its ends respectively in a pair of terminals with each of said terminals separating from said heat release portion by a metal sheathed cold portion; a mounting plate fixedly secured to said heating element about said cold portions; and aperture means in said side wall; said mounting plate having a hook portion that conforms to and engages a portion of said rim, an abutting surface portion that engages said side wall interior surface, and a projecting portion extending through said aperture and engageable with said side wall exterior surface to releasably secure said heating element to said side wall with said heat release portion cantilevered horizontally within said vessel and said pair of terminals cantilevered outwardly of said vessel.

4. A portable electric broiler comprising an open top vessel having a side wall with interior and exterior surfaces and terminating upwardly in a generally horizontal rim; a rigid metal sheathed electric resistance heating element having a heat release portion and terminating at its ends respectively in a pair of terminals; and a mounting plate fixedly secured to said heating element intermediate said heat release portion and said terminals; wall portions defining aperture means through said side wall; said mounting plate having an upper hook portion that conforms to and engages a portion of said rim, a surface portion that abuts said interior surface of said side wall to support said heating element with said heat release portion cantilevered within said vessel and said terminals cantilevered through said aperture means, and a projection extending through said aperture means and engageable by said aperture defining wall portions to align said heating element in the horizontal direction defined by said side wall interior surface adjacent said aperture means.

References Cited by the Examiner

UNITED STATES PATENTS

| | | | |
|---|---|---|---|
| 2,006,385 | 7/1935 | Dikeman | 99—446 |
| 2,214,060 | 9/1940 | McCormick | 99—446 |
| 2,332,117 | 10/1943 | Shepherd. | |
| 2,934,630 | 4/1960 | Altman et al. | 219—403 |
| 3,171,946 | 9/1965 | Ammerman | 219—403 X |
| 3,174,863 | 3/1965 | Shoup | 99—446 X |

WALTER A. SCHEEL, *Primary Examiner.*

STANLEY P. FISHER, *Assistant Examiner.*